Nov. 30, 1937.   W. C. DE GRAFF   2,100,945
MACHINE TOOL
Filed Oct. 27, 1936   5 Sheets-Sheet 1
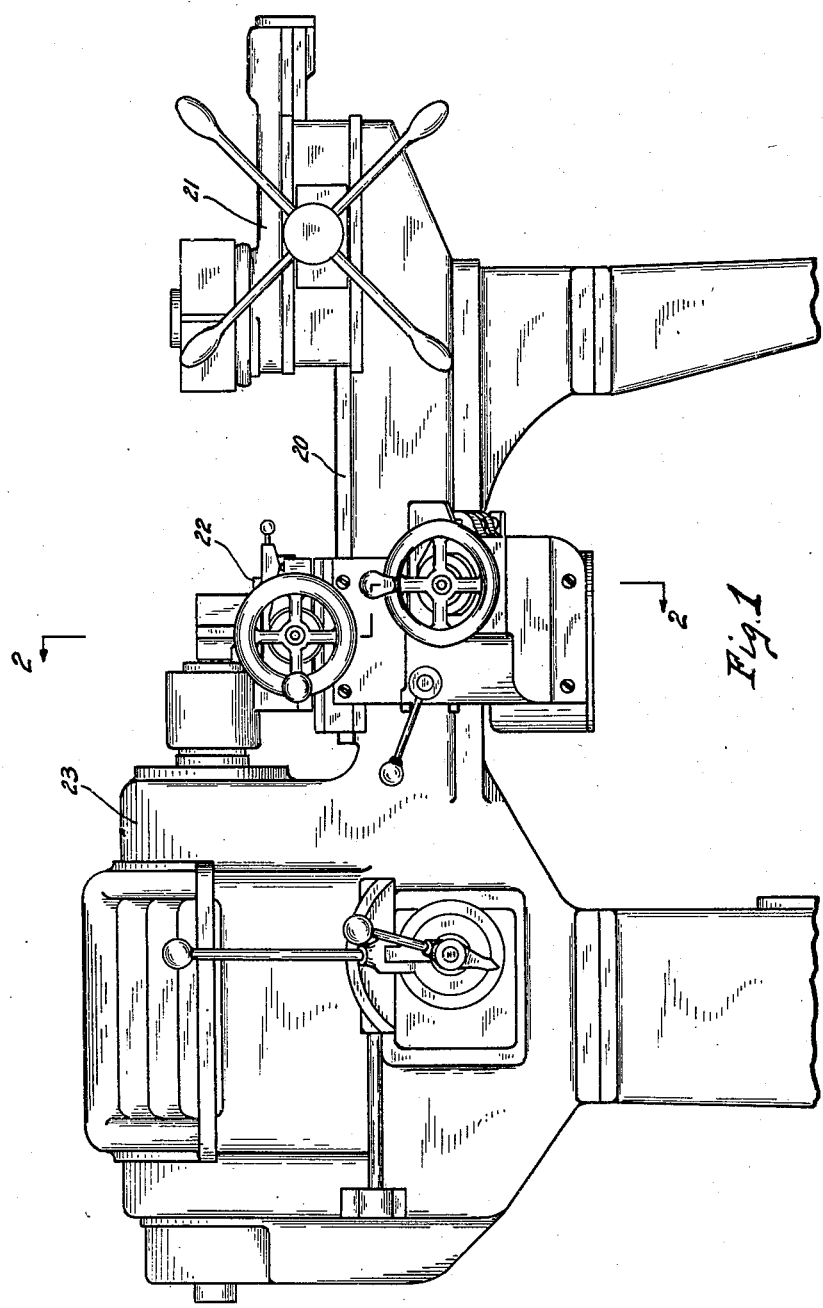
INVENTOR.
WILBUR C. DEGRAFF
BY
Kwis, Hudson & Kent
ATTORNEYS.

Nov. 30, 1937. W. C. DE GRAFF 2,100,945
MACHINE TOOL
Filed Oct. 27, 1936 5 Sheets-Sheet 2
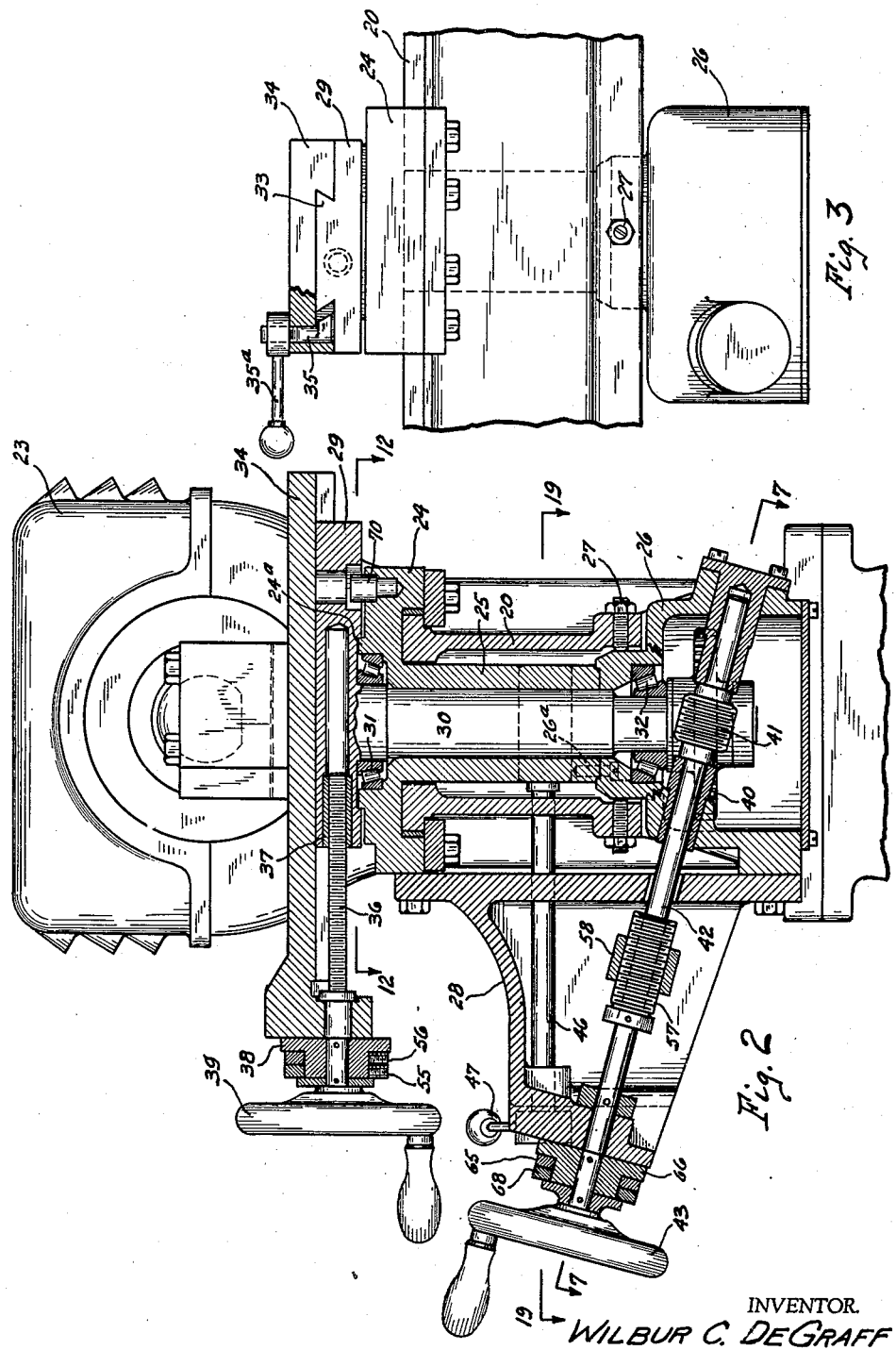
INVENTOR.
WILBUR C. DE GRAFF
BY
Kwis, Hudson & Kent
ATTORNEYS.

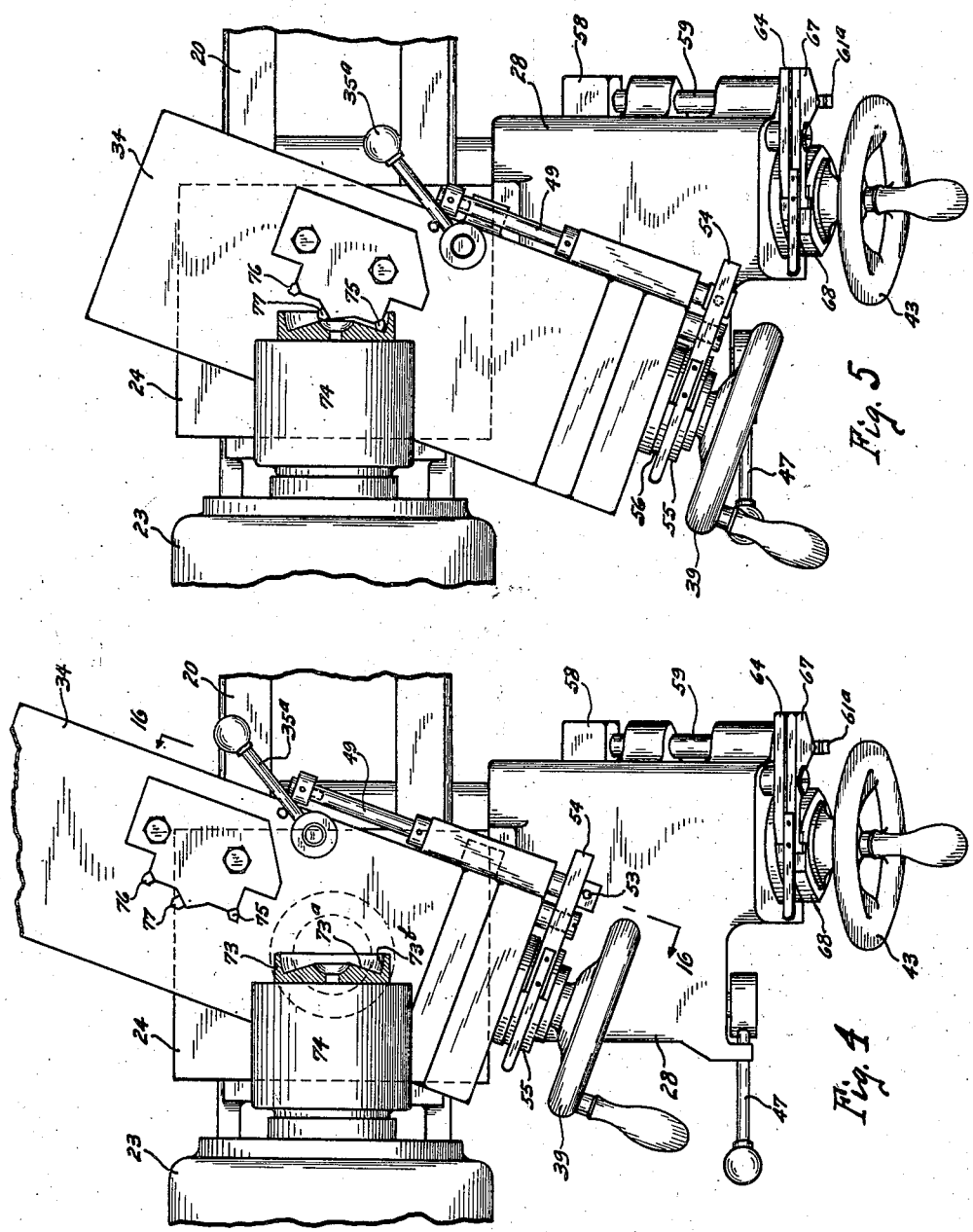

Nov. 30, 1937.  W. C. DE GRAFF  2,100,945
MACHINE TOOL
Filed Oct. 27, 1936   5 Sheets-Sheet 4
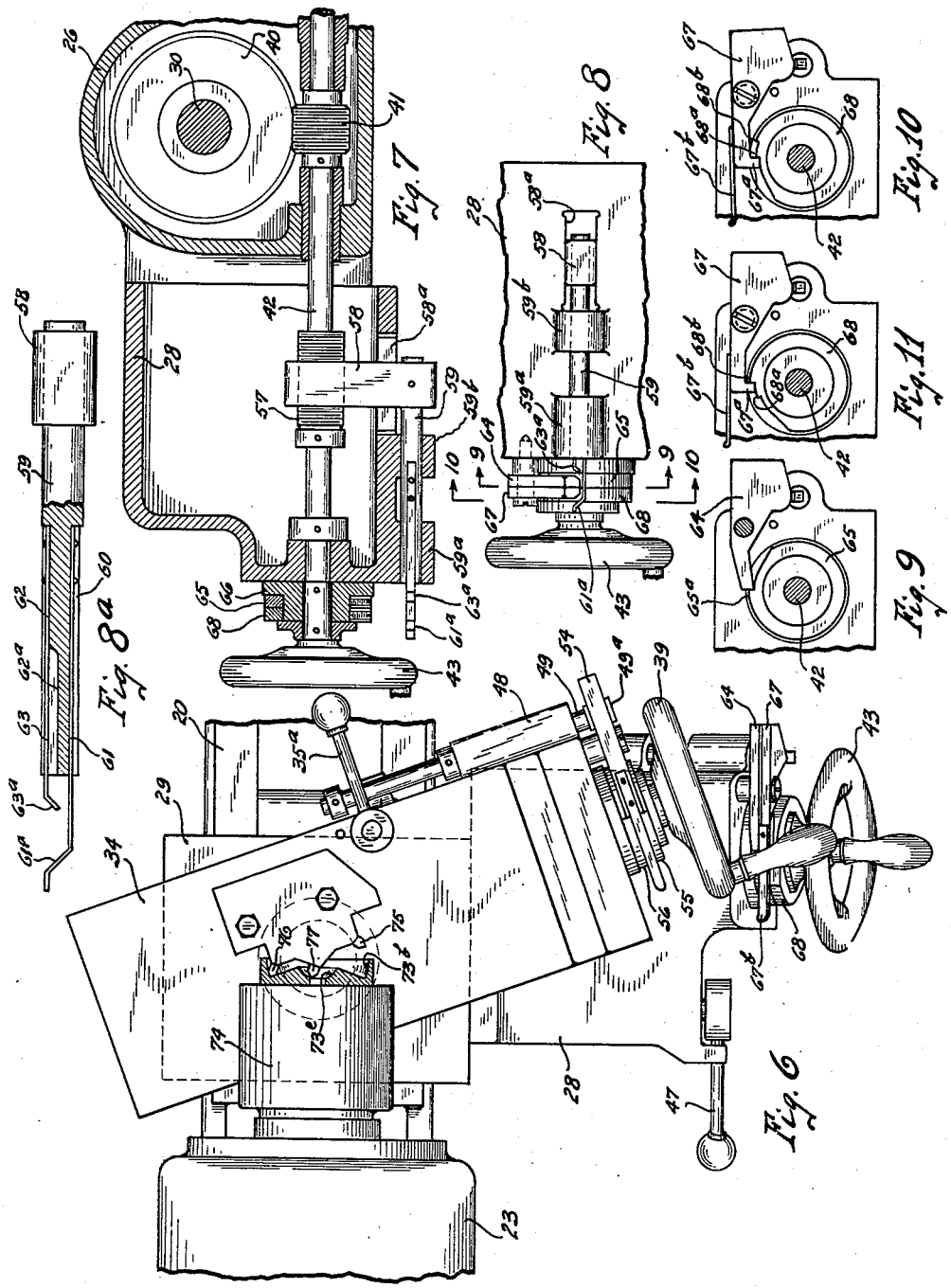
INVENTOR.
WILBUR C. DEGRAFF
BY
Kwis, Hudson & Kent
ATTORNEYS.

Nov. 30, 1937. W. C. DE GRAFF 2,100,945
MACHINE TOOL
Filed Oct. 27, 1936 5 Sheets-Sheet 5
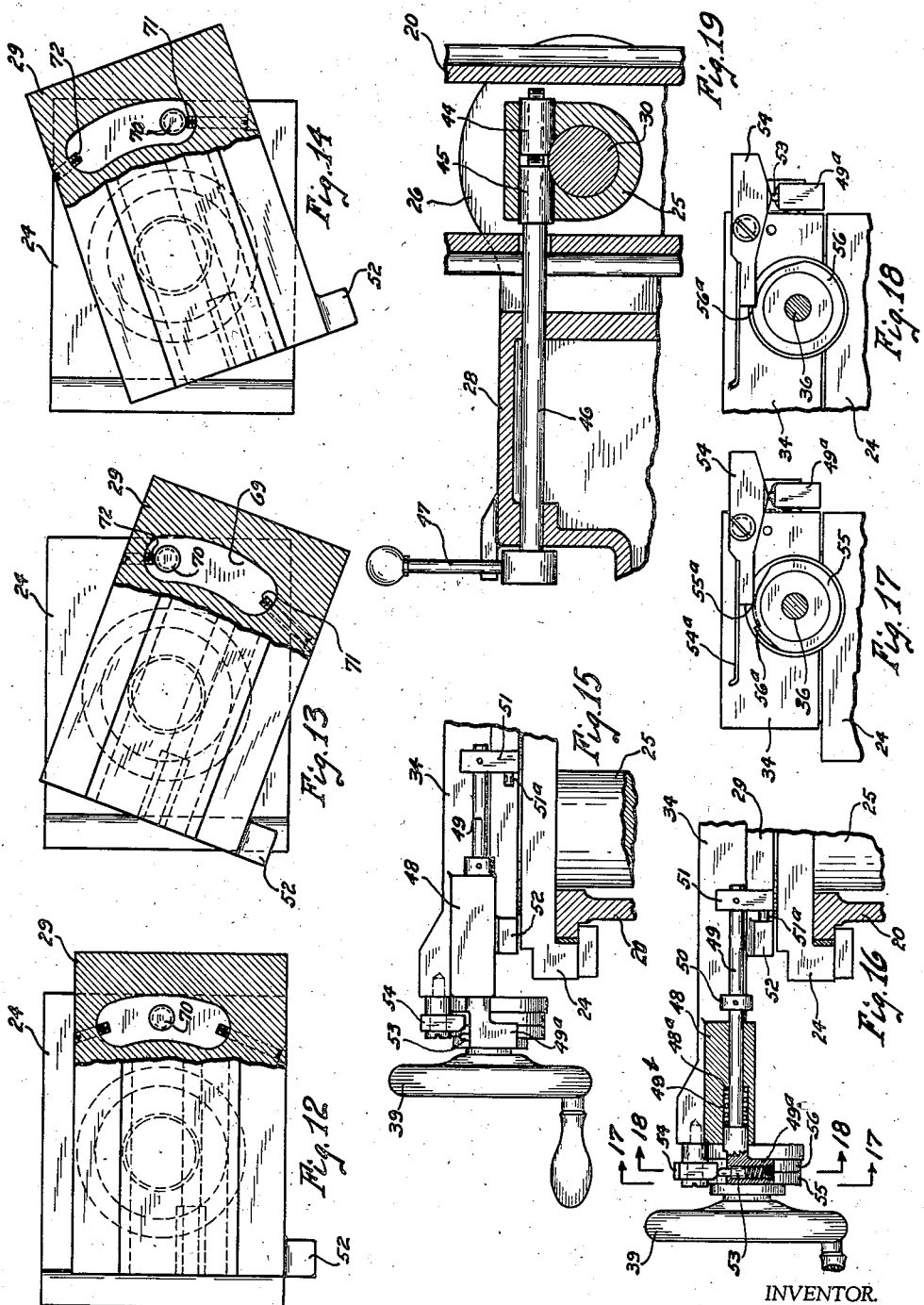
INVENTOR.
WILBUR C. DeGRAFF
BY
Kwis, Hudson & Kent
ATTORNEYS Patented Nov. 30, 1937

2,100,945

UNITED STATES PATENT OFFICE 2,100,945

MACHINE TOOL

Wilbur C. De Graff, Cleveland Heights, Ohio, assignor to The Warner & Swasey Company, Cleveland, Ohio, a corporation of Ohio Application October 27, 1936, Serial No. 107,834

17 Claims. (Cl. 82—12)

This invention relates to a machine tool and particularly to a machine tool having an improved cross slide support.

An object of the invention is to provide an improved cross slide support or carriage for a machine tool, whereby a plurality of different forms of cuts may be taken by the tool or tools in the work piece, such as, for example, a facing cut, a circular cut or a diagonal cut.

Another object is to provide in a machine tool a construction for a cross slide support or carriage such that the tool or tools can be positioned to take cuts in a direction perpendicular to the axis of the work, diagonal thereto, or it can follow a curved path with respect to the axis of the work.

Another object is to provide an improved cross slide support or carriage for a machine tool whereby the cutting tool or tools can be fed straight across or diagonally across the axis of the work or can also be fed in a circular path with respect to the axis of the work.

Another object is to provide a machine tool having a cross slide of the character specified in the hereinbefore named objects and wherein said cross slide is swivelly mounted upon its support or carriage in such manner that it has firmness and rigidity.

A further object is to provide a cross slide for a machine tool which can be adjusted to various angular positions with respect to the axis of the work piece and can be fed angularly or circularly with respect to said axis, and means for limiting the movement of the cross slide in its crosswise, diagonal or circular feeding movements.

Another object is to provide in a machine tool having a cross slide construction, as above specified, means whereby the feeding movements of the cross slide will be automatically stopped after the slide has moved a predetermined distance.

Another object is to provide in a machine tool having a cross slide construction, as above specified, abutting stop means for limiting the feeding movements of the cross slide and which means is out of abutting alignment during the major portion of the slide's movement, but automatically comes into such alignment just prior to the slide reaching its limit of feeding movement.

Another object is to provide a cross slide construction for a machine tool such as specified in the above named objects and wherein the means for controlling the adjustments and feeding movements of the cross slide is positioned within easy reach of the operator and at the front of the machine.

Further and additional objects and advantages not hereinbefore specified will appear hereinafter during the detailed description which is to follow of an embodiment of the invention.

In the accompanying drawings illustrating an embodiment of the invention,

Fig. 1 is a front elevational view of a machine tool having a cross slide embodying the invention.

Fig. 2 is a transverse sectional view on a larger scale than Fig. 1 and is taken approximately on irregular line 2—2 of Fig. 1 looking in the direction of the arrows.

Fig. 3 is a fragmentary side view taken looking from the right hand side of Fig. 2 and shows the cross slide in rear elevation with a portion of the cross slide broken away and shown in section.

Fig. 4 is a fragmentary view showing the cross slide in top plan and in position for loading and unloading the work piece.

Fig. 5 is a view similar to Fig. 4 but shows the cross slide in a position where one of the cutting tools has completed its operation upon the work piece.

Fig. 6 is a view similar to Figs. 4 and 5 but shows the cross slide in a different angular position with respect to the work piece and with two of the cutting tools having completed their radial cuts on the work piece.

Fig. 7 is a fragmentary sectional view taken substantially on line 7—7 of Fig. 2 looking in the direction of the arrows.

Fig. 8 is a fragmentary elevational view and is taken looking from the underside of Fig. 7 as viewed in the drawings.

Fig. 8a is a detached view of a portion of Fig. 8 on a larger scale.

Fig. 9 is a fragmentary sectional view taken substantially on line 9—9 of Fig. 8 looking in the direction of the arrows.

Fig. 10 is a fragmentary sectional view and is taken substantially on line 10—10 of Fig. 8 looking in the direction of the arrows.

Fig. 11 is a view similar to Fig. 10 but showing the parts in different position than in Fig. 10.

Fig. 12 is a horizontal sectional view taken substantially on line 12—12 of Fig. 2 looking in the direction of the arrows.

Figs. 13 and 14 are views similar to Fig. 12, but illustrating the parts in different equally adjusted positions of the cross slide and corresponding, respectively, to the bosses of the cross slide shown in Figs. 4 and 6.

Fig. 15 is a fragmentary elevational view of a portion of the cross slide and is taken from the right hand side of the slide as viewed in Fig. 1.

Fig. 16 is a sectional view taken substantially on line 16—16 of Fig. 4 looking in the direction of the arrows.

Fig. 17 is a sectional view taken substantially on line 17—17 of Fig. 16 looking in the direction of the arrows.

Fig. 18 is a fragmentary sectional view taken substantially on line 18—18 of Fig. 16 looking in the direction of the arrows, and Fig. 19 is a horizontal sectional view taken substantially on line 19—19 of Fig. 2 looking in the direction of the arrows.

Referring to Fig. 1, a turret lathe is illustrated which comprises a bed 20 provided with ways upon which the base of a turret slide 21 is adjustably positioned. A cross slide and its support or carriage, indicated generally at 22, is adjustably mounted on the ways of the bed intermediate the turret slide 21 and the head 23 of the machine, as will be well understood.

The support or carriage for the cross slide is indicated at 24 in Fig. 2 and is adapted to be clamped to the ways of the bed in various positions of adjustment depending upon the character of the work as will be well understood.

The support or carriage 24 is provided with a tubular portion 25 extending downwardly through the bed and between the ways thereof. Secured to the lower end of the tubular portion 25 of the support by means of screws 26a is a gear housing 26, as will later be explained. The gear housing 26 is supported in the lower portion of the bed 20 by means of thrust screws 27, and since the gear housing 26 in effect is part of the tubular portion 25, the support 24, portion 25 and gear housing 26 when the support is clamped to the ways will be rigidly held in its proper location upon the bed. At the front of the machine an apron 28 is secured by means of suitable bolts to the support 24 and to the gear housing 26, as clearly shown in Fig. 2.

The tubular portion 25 is provided with a cylindrical bore terminating at its upper end in a counterbore, while the upper side of the support 24 surrounding said counterbore is provided with an annular shoulder 24a. A base 29 for the cross slide is swivelly mounted on the support 24 by means of a downwardly extending spindle 30 formed integral on the underside of the base 29 and supported by a bearing 31 located in the counterbore in the support 24 and by a bearing 32 located in the gear housing 26. The underside of the base 29 is provided with a circular recess into which the shoulder 24a extends to prevent dirt from entering the bearing 31. The base 29 is provided with a guideway 33 upon which the cross slide 34 can move, it being noted by reference to Fig. 3 that said cross slide 34 can be clamped in various positions on the way 33 by means of a clamp indicated at 35 and operated by the lever 35a.

It will be understood that when the lever 35a is moved in one direction the clamp 35 is released to permit the cross slide 34 to move along the way 33, and when the lever 35a is moved in the opposite direction the cross slide is clamped to the way to prevent movement thereof. The cross slide 34 is moved along the way 33 of the base 29 by means of the screw 36 that is rotatably supported by the slide and extends through a stationary nut 37 carried by the base 29.

The screw 36 passes through an opening formed in a downward extension of the slide at the front end thereof and is held against endwise movement by means of a shoulder formed on the screw and by a collar 38 pinned to the screw, a suitable hand wheel 39 being fixed to the outer end of the screw for rotating the same to move the slide. The screw 36 imparts to the slide 34 its linear feeding movements when it is desired for the cutting tools to take facing or diagonal cuts in the work piece and depending upon the angular position of the swivel base 29 with respect to the work piece.

The lower end of the spindle 30 has fixed thereto a worm wheel 40 which meshes with a worm 41 on a rotatable shaft 42 that is supported in bearings formed in the gear housing 26 and in bearings formed in the apron 28, the shaft 42 extending diagonally downwardly through the apron and into the gear housing so that the operating handle 43 on the outer end of the shaft will be located in a convenient position for the operator.

It will be seen when the shaft 42 is rotated in one direction or the other that the spindle 30 will be slowly turned through the reduction drive formed by the worm wheel 40 and worm 41, with the result that the base 29 and cross slide 34 will turn with the spindle to feed the cutting tools carried by the cross slide in a curved path with respect to the work.

When it is desired to adjust the cross slide with respect to the axis of the workpiece when linear feeding movements are to be imparted to the cross slide, the hand wheel 43 can be turned to bring the slide into the desired position, after which the spindle 30 is clamped against rotative movement by means of clamping nuts 44 and 45 located in an opening formed in the tubular portion 25 of the support. The clamping nut 44 is threaded and arranged on the threaded end of a shaft 46, while the clamping nut 45 is provided with a smooth bore and abuts at one end a shoulder formed on the shaft 46.

It will be seen that the shaft 46 is rockably supported in the apron, and when said shaft is rocked by means of the handle 47 mounted on the outer end thereof the clamping nuts 44 and 45 can be moved relatively toward or away from each other, and hence the spindle 30 can be clamped against rotation or released for rotative movement.

The mechanism for stopping the linear feeding movement of the cross slide in accurately predetermined positions will now be described. The cross slide 34 is provided on its side and adjacent its front end with an elongated boss 48 provided with a bore therethrough that communicates with a counterbore 48a adjacent the front end of the boss. A rod 49 is slidably mounted in the boss and is provided at its forward end with an inverted L-shaped portion 49a that has one of its arms extending into the counterbore 48a. A spring 49b is located in the counterbore between the inner end of the portion 49a and the bottom of the counterbore and surrounds the rod 49 and this spring acts normally to urge the rod 49 toward the left, as viewed in Fig. 16, until the collar 50 that is pinned to the rod abuts the right hand end of the boss 48 as shown in Fig. 15. The right hand end of the rod 49 has pinned thereto a downwardly extending arm 51 that carries a laterally projecting stop pin 51a that is adapted to abut a stop lug 52 formed on the base 29 and just prior to the slide 34 reaching its most left hand position as viewed in Fig. 16, wherefore further movement of the slide 34 toward the left acts to compress the spring 49b and move the rod 49 relatively toward the right with respect to the slide. The inverted L-shaped portion 49a of the rod is provided with a spring-pressed plunger 53 adapted to cooperate with a camming surface formed on the underside of a rockable pawl 54 when the rod 49 moves toward the right relatively with respect to the slide 34 after the stop pin 51a has engaged the stop lug 52.

Before the engagement of the stop pin 51a with the stop lug the plunger 53 is out of contact with the camming undersurface of the pawl 54, as clearly shown in Fig. 15. The pawl 54 is so counterweighted that it normally swings in a clockwise direction when the plunger 53 is not in engagement therewith, but as soon as the plunger 53 rides beneath the pawl the latter is rocked in an anti-clockwise direction to bring the left hand end of the pawl as viewed in Fig. 17 into engagement with the periphery of a stop ring 55 that is adjustably mounted on the shouldered collar 38 pinned to the screw 36, wherefore the stop ring will rotate with the collar and the screw.

The periphery of the stop ring 55 is provided with a stop shoulder 55a which cooperates with the pawl 54 to stop the rotation of the ring 55 and the screw 36, with the result that the linear feeding movement of the slide is stopped.

It will be seen that the cross slide can be linearly moved by the rotation of the screw 36 a considerable distance before the stop pin 51a engages the lug 52 and before the pawl 54 is automatically moved by the plunger 53 into engagement with the periphery of the stop ring 55 and comes into engagement with the stop shoulder 55a. This movement of the slide is clearly shown in Figs. 4 and 5, it being understood that the slide is moved by the rotation of the screw 36 from the position shown in Fig. 4 to that shown in Fig. 5 before the rotation of the screw is stopped by the engagement of the pawl 54 with the shoulder 55a.

As will be later explained the rotation of the screw 36 is stopped when the lower cutting tool, as viewed in Figs. 4 and 5, has substantially completed its diagonal cut, although there is still a slight clearance between the tool and the radial surface of the work piece yet to be machined. A second stop ring 56 is adjustably mounted on the shouldered collar 38 for cooperation with the pawl 54. The pawl 54 can be manually raised out of engagement with the periphery of the stop ring 55 by means of a handle extension 54a, it being understood that such movement of the pawl acts to depress the plunger 53 against the action of its spring.

When the operator moves the pawl 54 out of engagement with the stop ring 55 he may then rotate the screw 36 a fraction of a turn to move the slide linearly a short distance or until the pawl 54 engages the periphery of the stop ring 56 and contacts with a stop shoulder 56a formed on said ring for a purpose to be later explained when the entire cycle of operation of the machine is described.

It will be understood when the screw 36 is rotated in the opposite direction from the position just described to move the slide toward the right as viewed in Fig. 16 that before the completion of the first turn of the screw the plunger 53 has moved out of engagement with the underside of the stop pawl 54, wherefore the latter swings by gravity to an inactive position with respect to the stop rings 55 and 56.

The mechanism whereby the turning movements of the base 29 and cross slide 34 can be stopped in predetermined positions will now be described with particular reference to Figs. 7 to 11 inclusive. The shaft 42 has pinned thereto a threaded sleeve 57 that extends through a threaded opening in a bar 58, whereby rotation of the shaft 42 effects an endwise movement of the bar 58. The bar 58 is guided in its endwise movements by the walls of a slot 58a formed in the apron, as clearly shown in Figs. 7 and 8. A rod 59 is secured to the outer end of the bar 58 and said rod projects forwardly through spaced guiding lugs 59a and 59b formed exteriorly on the apron. The rod 59 is provided on its underside and at its free end with a longitudinally extending groove 60 in which is secured a flat spring 61 that projects beyond the end of the rod and is provided at its outer end with a camming portion 61a. It will be seen that the spring 61 is free to be flexed or bent downwardly. The upper side of the rod 59 is also provided with a groove 62 having adjacent its outer end a portion of increased depth, indicated in Fig. 8a at 62a. A flat spring 63 of shorter length than the spring 61 is secured in the groove 62 and is provided at its outer end with a camming portion 63a, it being noted that the spring 63 can be flexed or bent downwardly due to the increased depth of the portion 62a of the groove.

The camming portion 63a of the spring 63 is adapted to cooperate with the under edge of a pivoted pawl 64 when the rod 59 is moved toward the left, as viewed in the drawings, to rock said pawl to bring the reduced left hand end of the pawl into engagement with the periphery of a stop ring 65, as shown in Fig. 9, it being understood that when the camming portion 63a of the spring is not in engagement with the under edge of the pawl that the latter rocks by gravity in the opposite direction.

The stop ring 65 is adjustably secured on a shouldered collar 66 that is pinned to the shaft 42 to rotate therewith. The stop ring 65 has on its periphery a stop shoulder 65a with which the pawl 64 engages to stop the rotation of the shaft 42 in a clockwise direction.

The camming portion 61a of the spring 61 is adapted to cooperate with the under edge of a pivoted pawl 67 to rock the latter to bring its hooked end 67a into engagement with the periphery of a stop ring 68 that is adjustably secured upon the shouldered collar 66 outwardly of the stop ring 65 previously referred to. The periphery of the stop ring 68 is provided with spaced stop shoulders 68a and 68b, respectively. When the hooked end 67a of the pawl contacts with the stop shoulder 68a, the rotation of the shaft 42 in an anti-clockwise direction is stopped, (see Fig. 10). The operator can manually rock the pawl 67 by the handle 67b to disengage the hooked end 67a from the shoulder 68a and allow a slight further rotation of the shaft 42 in an anti-clockwise direction, or until the hooked end 67a engages the shoulder 68b, as shown in Fig. 11. The purpose of this arrangement will later be more fully described.

It will be seen that when the shaft 42 is rotated in one or the other direction the rod 59 will slowly move inwardly or outwardly as the case may be to bring either the camming portion 61a of the spring 61 or the camming portion 63a of the spring 63 into operative contact with their cooperating pawls.

The camming portions of the springs 61 and 63 are so designed and cooperate with the pawls 64 and 67 in such manner that the slide may be rocked from the position shown in Fig. 5 to that shown in Fig. 6, and that just prior to the completion of this rocking movement the pawls automatically come into contact with their respective stop rings as the case may be, to prevent further rotation of the shaft 42.

It will be understood that in order to rock the slide from the position shown in Fig. 5 to the position shown in Fig. 6 the hand wheel 43 will be given a number of turns and just prior to the completion of the last turn of the hand wheel the automatic throwing in of the pawls for the purpose of stopping the rotation of the shaft becomes effective. It will further be understood that when one or the other of the pawls is in contact with its respective stop ring the rotation of the shaft 42 in the opposite direction can be carried out and such rotation acts automatically to restore the pawls to their initial inactive position.

It will be understood that the stop rings 65 and 68 are accurately secured in adjusted position upon the shouldered collar 66, so that the cooperating pawls 64 and 67 come into contact with the stop shoulders on the rings to effect a cessation of the rotation of the shaft 42 when the base and slide have turned the predetermined amount.

Ordinarily the rings can be so accurately positioned that the hand wheel 43 may be slowly and gently turned near the end of the feeding movement until the rotation of the shaft is finally stopped with the base and slide in the exact predetermined angular position. However, it might occur that the stop rings were moved out of their adjusted position, due to too fast or forceful rotation of the hand wheel, with the result that the base and slide would not be stopped in the proper predetermined positions. In order to safeguard against this possibility the following arrangement is employed: The base 29 is provided with an arcuate opening 69 into which extends an abutment pin 70 carried by the support 24, as clearly shown in Figs. 2, 12, 13, and 14. The abutment pin 70 is located on the arcuate center line of the opening 69, while adjustable abutting screws 71 and 72 are carried by the base 29 at the opposite ends of the opening 69 and lying also along the arcuate center line of the opening, wherefore the screws will have a right angle abutting contact with the abutting pin 70 when the base 29 reaches its limit of turning movement in opposite directions.

The operation of the machine through a complete operative cycle will now be explained in order to more fully bring out the novel features of the invention. Assuming that the stop rings 55 and 56 have been properly positioned and secured upon the shouldered collar 38 fixed to the screw 36 to automatically limit the linear feeding movements of the cross slide, and further assuming that the stop rings 65 and 68 have also been properly positioned upon the shouldered collar 66 that is fixed to the shaft 42 to automatically limit the turning movement of the cross slide, and also that the stop screws 71 and 72 have been properly positioned to effect a positive stopping of the turning movement of the cross slide when the cross slide is in the position shown in Fig. 4, the work piece 73 can be positioned in any suitable manner in the chuck 74 on the work spindle in the head. When the cross slide is in the position shown in Fig. 4, it will be understood that the turret slide 21 can be moved forwardly so that tools carried by the turret can operate upon the work piece if desired. When the cross slide is in the position shown in Fig. 4, which is the proper position for purposes of loading and unloading the work piece 73, the pawl 54 is in inactive position and the hand wheel 39 can be turned to rotate the screw 36, at which time the stop pin 51a lies to the right of the stop lug 52 a considerable distance, as shown in Fig. 15. Also at this time the pawl 67 will be in the position shown in Fig. 11 with the hooked end 67a thereof engaging the abutment shoulder 68b on the stop ring 68 to prevent rotation of the hand wheel 43 and shaft 42 in an anti-clockwise direction. Further at this time the clamp nuts 44, 45, see Fig. 19, will be in a position to clamp the spindle 30 to prevent rotation of the base 29 and cross slide 34. The operation now calls for a linear feeding movement of the cross slide, and since the clamp 35 is in disengaged position, rotation of the hand wheel 39 in a clockwise direction will effect a linear movement of the cross slide. The first part of this linear movement of the cross slide will bring the cutting tool 75 into contact with the conical surface 73a of the work piece, and a continuation of said movement will feed the tool 75 across the surface 73a to machine the same until the cutting tool has reached the position shown in Fig. 5. It is desirable that the feeding movement of the cutting tool 75 stops so that there is a clearance between the tool and the outer curved surface 73b of the work piece, this clearance in the present instance, for example, being approximately .020 of an inch. Just prior to the cutting tool 75 reaching this point the stop pin 51a engages the lug 52 on the base, and the further movement of the slide compresses the spring 49b and moves the plunger 53 into engagement with the under edge of the pawl 54 to rock the latter and bring it into engagement with the periphery of the stop ring 55. Since the rotation of the stop ring 55 with the screw 36 brings the stop shoulder 55a on the ring into abutting engagement with the end of the pawl 54, see Fig. 17, further rotation of the hand wheel 39 and screw 36 is arrested automatically.

The operator now moves the clamp 35 to clamping position to prevent linear movement of the cross slide and releases the clamp nut 44, 45 by the handle 47 to permit turning movement of the cross slide base and cross slide. At this time the pawl 67 is in engagement with the stop shoulder 68b on the stop ring 68 and holds said ring and shaft 42 against rotation in an anti-clockwise direction. The operator rotates the hand wheel 43 in a clockwise direction to effect a swinging movement of the slide from the position shown in Fig. 5 to the position shown in Fig. 6, it being understood that during the clockwise rotation of the hand wheel and the stop ring 68 the rod 59 moves toward the left to first move the camming portion 61a of the spring 61 out of engagement with the pawl 67 to let the latter become inactive, and subsequently to move the camming portion 63a of the spring 63 into engagement with the under edge of the pawl 64 to rock the latter into engagement with the periphery of the stop ring 65.

The engagement of the camming portion 63a with the pawl 64 to rock the latter takes place automatically just prior to the cutting tool 76 and the cutting tool 77 reaching the position shown in Fig. 6.

It will be seen that during the swinging movement of the cross slide the cutting tool 76 has machined the curved outer surface 73b of the work, while the cutting tool 77 has machined the inner curved surface 73c of the work piece. As already stated, the pawl 64 is rocked into engagement with the periphery of the stop ring 65 just prior to the tools 76 and 77 completing their feeding movement, so that a continuation of the rotation of the hand wheel 43 will cause the stop shoulder 65a on the stop ring to engage with the pawl 64 to stop the further feeding movement of the tools 76 and 77 in a curved path at a point where the surfaces 73b and 73c have been completed, that is, the outer curved surface 73b meets the conical surface 73a. The operator now moves the handle 35a to unclamp the clamp 35 to permit linear movement of the slide 34. He then manually raises the pawl 54 by means of the handle 54a out of contact with the stop shoulder 55a on the stop ring 55, whereupon a rotation of the hand wheel 39 through a fraction of a turn brings the stop shoulder 56a on the stop ring 56 into engagement with the pawl 54 to arrest further rotation of the hand wheel 39. When the hand wheel 39 is rotated through this portion of a turn the cross slide is linearly moved to back off the cutting tools 76 and 77 a short distance from the work, this clearance being approximately .010 of an inch. The operator now rotates the hand wheel 43 in an anti-clockwise direction to cause the cross slide to swing to approximately the position shown in Fig. 5. It will be remembered that the cutting tools 76 and 77 have been backed away from the work with a clearance of .010 of an inch and that the cutting tool 75 which initially had a clearance of .020 of an inch will now have a clearance of .010 of an inch, and hence the swinging movement of the cross slide will not cause any of the tools to score the work.

In order to swing the cross slide to the position just referred to, i. e., approximately the position shown in Fig. 5, the hand wheel 43 is rotated in an anti-clockwise direction until the camming portion 61a of the spring 61 engages the under edge of the pawl 67 and rocks the latter to bring the hook 67a into engagement with the periphery of the stop ring 68. A further slight rotation of the hand wheel 43 causes the stop shoulder 68a of the stop ring 68 to contact with the hook 67a of the pawl, as clearly shown in Fig. 10, and hence further rotative movement of the hand wheel in an anti-clockwise direction is arrested. The purpose of stopping the swinging movement of the slide just prior to reaching the position shown in Fig. 5 is to keep the cutting tool 75 clear of the surface 73a of the work piece, so that the slide can be moved linearly without causing said tool to score said surface. The operator now rotates the hand wheel 39 to move the slide linearly to clear the cutting tool from the work, during which rotation of the hand wheel 39 the pawl 54 is automatically restored to inactive position as the stop pin 51a moves out of engagement with the abutment lug 52.

When the slide has been moved linearly sufficiently far to free the tools from the work and to enable the unloading and loading of the work pieces, the operator manually raises the pawl 57 by the handle 67b to disengage the hook 67a from the stop shoulder 68a, at the same time rotating slowly the hand wheel 43 and releasing the handle 67b to allow the pawl to again engage the periphery of the stop ring 68. The slow rotation of the hand wheel through a portion of a turn causes the stop shoulder 68b on the stop ring to engage the hook 67a on the pawl to thus arrest further swinging movement of the slide, at which time the slide will again be in the position shown in Fig. 4 and the cycle of operation just explained can be repeated.

It will be understood that although a particular number of cutting tools have been illustrated herein for performing certain specified operations upon a particular work piece, that the number of the cutting tools, the character of the cutting block, the type of operations to be performed by the tools and the form of the work piece could be varied to meet the different conditions as desired, inasmuch as the support and swivel base for the cross slide enable the slide to be moved linearly and circularly so as to produce various types of cuts.

It will further be seen that due to the automatic functioning of the pawls and stop rings the operator can efficiently operate the machine and merely needs to turn the hand wheels until the stops automatically arrest further rotation thereof in its feeding or positioning movements. This results in accurate machining of the work piece to very close dimensions and tolerances. In addition it will be observed that the cross slide carriage, including the swivel base and its operating parts, are so constructed that the hand wheels and levers for operating the machine are located within convenient reach of the operator, thus facilitating the operation of the machine and increasing its efficiency. Furthermore the manner in which the spindle of the swivel base is mounted in spaced bearings in the support assures a rigid and firm support for the cross slide, thereby increasing the efficiency and accuracy of the machine.

Although several preferred embodiments of the invention have been illustrated and described herein, it should be understood that the invention is susceptible of various modifications and adaptations within the scope of the appended claims.

I claim:

1. In a machine tool having a carriage, a base pivotally mounted on said carriage and adapted to have a cutting tool operatively associated therewith, means for rotating said base on its pivot to feed the cutting tool in a circular path, and cooperating means carried in part by said first named means and having stop portions normally held out of alignment with each other but automatically moved into abutting alignment for stopping the rotating movement of said base when said cutting tool has reached a predetermined position.

2. In a machine tool having a carriage, a base pivotally mounted on said carriage and adapted to have a cutting tool operatively associated therewith, means for rotating said base on its pivot to feed the cutting tool in a circular path, cooperating means carried in part by said first named means and having stop portions normally held out of alignment with each other but automatically moved into abutting alignment for stopping the rotating movement of said base when said cutting tool has reached a predetermined position, and means for automatically restoring said stop portions to their inactive positions when said rotating means is rotated in the opposite direction.

3. In a machine tool having a cross slide carriage, a cross slide adapted to carry a cutting tool, rotating means for moving said cross slide linearly to feed the cutting tool carried thereby, cooperating means carried in part by said rotating means and having stop portions normally held out of alignment with each other but automatically moved into abutting alignment for stopping the linear movement of said slide when said cutting tool has reached a predetermined position, and means for automatically restoring said stop portions to their inactive positions when said rotating means is rotated in the opposite direction.

4. In a machine tool having a cross slide carriage, a cross slide base pivotally mounted on said carriage and having a cross slide linearly movable thereon and adapted to be provided with a cutting tool, means for rotating said base on its pivot and for moving said slide linearly on said base to feed the cutting tool in a circular path and a linear path, and cooperating means carried in part by said first named means and having stop portions normally held out of alignment with each other but automatically moved into abutting alignment for stopping the linear movement of the slide after it has traveled a predetermined distance.

5. In a machine tool having a cross slide carriage, a cross slide base pivotally mounted on said carriage and having a cross slide linearly movable thereon and adapted to be provided with a cutting tool, means for rotating said base on its pivot and for moving said slide linearly on said base to feed the cutting tool in a circular path and a linear path, and cooperating means carried in part by said first named means and having stop portions normally held out of alignment with each other but automatically moved into abutting alignment for stopping the rotating and linear movements when said cutting tool has reached a predetermined position.

6. In a machine tool having a carriage, a base pivotally mounted on said carriage and adapted to have a cutting tool operatively associated therewith, means for oscillating said base on its pivot to move the cutting tool in a circular path, and cooperating means carried in part by said first named means and having stop portions normally held out of alignment with each other but automatically moved into abutting alignment for stopping the oscillating movement of said base when said cutting tool has traveled a predetermined distance in each direction.

7. In a machine tool having a carriage, a base pivotally mounted on said carriage and adapted to have a cutting tool operatively associated therewith, means for oscillating said base on its pivot to move said cutting tool in a circular path, cooperating means carried in part by said first named means and having stop portions normally held out of alignment with each other but automatically moved into abutting alignment for stopping the oscillating movement of said base when said cutting tool has traveled predetermined distances in each direction, and means for automatically restoring said portions to their inactive positions when the operation of said oscillating means is reversed.

8. In a machine tool having a movable member, a rotating part for moving said member, cooperating means partially carried by said rotating part and having stop portions normally held out of alignment with each other but automatically moved into abutting alignment for stopping rotation of said part and movement of said member when the latter has traveled a predetermined distance in one direction or the other, and means for automatically restoring said portions to their inactive positions upon reverse rotation of said part.

9. In a machine tool, a pivoted member, means for oscillating said member on its pivot, cooperating means carried in part by said first named means and having stop portions normally held out of alignment with each other but automatically moved into abutting alignment for stopping oscillation of said member when it has traveled through predetermined arcs in opposite directions, and means for automatically restoring said portions to their inactive positions when the movement of said oscillating means is reversed.

10. In a machine tool, a pivoted member, means for rotating said member on its pivot and including a shaft having a threaded portion, camming means operatively associated with said threaded portion for movement in timed relation therewith, and means cooperating with said camming means for automatically stopping rotation of said shaft and movement of said member when the latter has traveled through a predetermined arc.

11. In a machine tool, a pivoted member, means for rotating said member on its pivot and including a rotatable shaft having a threaded portion, camming means operatively associated with said threaded portion for movement in timed relation with said shaft, and means cooperating with said camming means and including a stop ring carried by said shaft and a pivoted pawl for automatically stopping rotation of said shaft and movement of said member when the latter has traveled through a predetermined arc.

12. In a machine tool, a pivoted member, means for oscillating said member on its pivot and including a rotatable shaft having a threaded portion, camming means operatively associated with said threaded portion for movement in timed relation with respect to the rotation of said shaft, and means cooperating with said camming means for automatically stopping oscillation of said member when it has traveled through predetermined arcs in opposite directions and including two stop rings carried by said shaft and pawls cooperating with said stop rings, one of said pawls and stop rings being active when the shaft is rotated in one direction and the other of said pawls and stop rings being active when the shaft is rotated in the opposite direction.

13. In a machine tool, a linearly movable member, a rotatable part for moving said member, and means for automatically stopping rotation of said part and movement of said member when the latter has traveled a predetermined distance and including means first movable with said member and then movable relative thereto, a stop ring operatively associated with said rotatable part, and a pawl movable into contact with said stop ring by said last named means when the latter moves relative to said member.

14. In a machine tool, a linearly movable member, a rotatable part for moving said member, means for automatically stopping movement of said member when it has traveled a predetermined distance and including an endwise movable rod carried by said member and normally movable therewith, an abutment pin carried by said rod, a fixed abutment lug carried by the machine whereby when movement of said member and rod effects an engagement between said pin and lug relative movement occurs between said rod and member, a stop ring carried by said rotatable part, and a pivoted pawl adapted to be operatively associated with said rod during said relative movement to be moved into contact with said stop ring to stop the rotation of said ring and part.

15. In a machine tool, a carriage having an elongated tubular portion provided with bearings adjacent its opposite ends, and a base adapted to have a cutting tool operatively associated therewith mounted on said carriage and including a spindle extending into said tubular portion and rotatably supported in said bearings.

16. In a machine tool, a bed having ways, a carriage mounted on the ways of said bed and provided with an elongated tubular portion extending between the ways and having spaced bearings arranged therein with one above the ways and the other below the ways, a base adapted to have a cutting tool operatively associated therewith mounted on said carriage and having a spindle extending into and beyond said tubular portion and supported in said spaced bearings, a worm wheel mounted on said spindle on the portion thereof extending beyond said tubular portion, and an operating shaft having a worm meshing with said worm wheel for imparting rotation to said spindle and said base, whereby a circular feeding movement can be imparted to the cutting tool carried by said base.

17. In a machine tool, a pivoted member, means for oscillating said member on its pivot, means for automatically stopping oscillation of said first means and said member when the latter travels through predetermined arcs in opposite directions, and means forming auxiliary stops for said member to positively prevent movement thereof in opposite directions beyond said predetermined arcs and including a fixed stop pin extending into an arcuate groove formed in said member, and adjustable stop screws carried by said member and located at the opposite ends of said groove and adapted to abut said pin.

WILBUR C. DE GRAFF.